United States Patent
Madasu et al.

(10) Patent No.: US 12,305,632 B2
(45) Date of Patent: May 20, 2025

(54) PUMP SYSTEMS AND METHODS TO IMPROVE PUMP LOAD PREDICTIONS

(71) Applicant: Landmark Graphics Corporation, Houston, TX (US)

(72) Inventors: Srinath Madasu, Houston, TX (US); Keshava Prasad Rangarajan, Sugarland, TX (US)

(73) Assignee: Landmark Graphics Corporation, Houston, TX (US)

( * ) Notice: Subject to any disclaimer, the term of this patent is extended or adjusted under 35 U.S.C. 154(b) by 570 days.

(21) Appl. No.: 16/763,432

(22) PCT Filed: Jan. 31, 2019

(86) PCT No.: PCT/US2019/016140
§ 371 (c)(1),
(2) Date: May 12, 2020

(87) PCT Pub. No.: WO2020/159525
PCT Pub. Date: Aug. 6, 2020

(65) Prior Publication Data
US 2021/0222688 A1    Jul. 22, 2021

(51) Int. Cl.
*F04B 47/02*    (2006.01)
*E21B 43/12*    (2006.01)
(Continued)

(52) U.S. Cl.
CPC ............ *F04B 47/02* (2013.01); *E21B 43/127* (2013.01); *F04B 47/022* (2013.01);
(Continued)

(58) Field of Classification Search
CPC ...... F04B 47/02; F04B 47/022; F04B 49/065; F04B 2201/121; F04B 2207/01;
(Continued)

(56) References Cited

U.S. PATENT DOCUMENTS 4,681,515 A * 7/1987 Allen .................... F04B 47/028
92/13.7
4,973,226 A * 11/1990 McKee ................. E21B 47/009
417/18
(Continued)

FOREIGN PATENT DOCUMENTS

WO    2018165352 A1    9/2018

OTHER PUBLICATIONS

Wikipedia article titled "Loss Function" (Year: 2018).*
(Continued)

*Primary Examiner* — Christopher S Bobish
(74) *Attorney, Agent, or Firm* — DeLizio, Peacock, Lewin & Guerra LLP

(57) ABSTRACT

The disclosed embodiments include pump systems and methods to improve pump load predictions of pumps. The method includes determining, in a neural network, a pump load of a wellbore pump based on a physics based model of the pump load of the wellbore pump. The method also includes obtaining a measured pump load of the wellbore pump. After initiation of a pump cycle of the wellbore pump, the method further includes predicting a pump load of the wellbore pump based on the physics based model, performing a Bayesian Optimization to reduce a difference between a predicted pump load and the measured pump load to less than a threshold value, and improving a prediction of the pump load based on the Bayesian Optimization.

18 Claims, 3 Drawing Sheets

(51) Int. Cl.
  *F04B 49/06* (2006.01)
  *G05B 13/02* (2006.01)
  *G06N 3/02* (2006.01)
(52) U.S. Cl.
  CPC .......... *G05B 13/0265* (2013.01); *G06N 3/02* (2013.01); *F04B 49/065* (2013.01); *F04B 2201/121* (2013.01); *F04B 2207/01* (2013.01)
(58) Field of Classification Search
  CPC ......... E21B 43/127; E21B 43/22; G06N 3/02; G05B 13/0265; G05B 13/027
  See application file for complete search history.

(56) References Cited

U.S. PATENT DOCUMENTS

| | | | | |
|---|---|---|---|---|
| 5,281,100 | A * | 1/1994 | Diederich | F04B 47/02 |
| | | | | 417/399 |
| 6,343,656 | B1 * | 2/2002 | Vazquez | F04B 47/02 |
| | | | | 73/861.43 |
| 9,645,575 | B2 * | 5/2017 | Watson | G06N 7/005 |
| 9,720,424 | B2 * | 8/2017 | Ige | G05B 13/04 |
| 10,443,358 | B2 * | 10/2019 | Rashid | G05D 7/0635 |
| 10,781,813 | B2 * | 9/2020 | Assad | G01L 25/00 |
| 11,208,876 | B2 * | 12/2021 | Eslinger | E21B 43/121 |
| 11,480,039 | B2 * | 10/2022 | Beck | F04B 51/00 |
| 2002/0120401 | A1 * | 8/2002 | Macdonald | E21B 44/005 |
| | | | | 702/6 |
| 2008/0010020 | A1 * | 1/2008 | Ellender | G01V 1/40 |
| | | | | 702/6 |
| 2016/0194942 | A1 | 7/2016 | Wiegman et al. | |
| 2017/0002805 | A1 * | 1/2017 | Williams | F04B 17/03 |
| 2017/0235284 | A1 * | 8/2017 | Watson | E21B 41/0092 |
| | | | | 700/31 |
| 2017/0328194 | A1 | 11/2017 | Liu et al. | |
| 2019/0024497 | A1 * | 1/2019 | Harding | E21B 47/008 |
| 2020/0191136 | A1 * | 6/2020 | Hoefel | F04B 47/026 |
| 2021/0071509 | A1 * | 3/2021 | Beck | G06N 3/04 |
| 2021/0140290 | A1 * | 5/2021 | Eslinger | E21B 43/12 |
| 2022/0090593 | A1 * | 3/2022 | Bevan | E21B 43/127 |

OTHER PUBLICATIONS

International Search Report and Written Opinion date mailed Oct. 30, 2019, International PCT Application No. PCT/US2019/016140.
Berkenkamp, Felix, Andreas Krause, and Angela P. Schoellig. "Bayesian optimization with safety constraints: safe and automatic parameter tuning in robotics." arXiv preprint arXiv:1602.04450 (2016).
Snoek, Jasper, et al. "Scalable bayesian optimization using deep neural networks." International conference on machine learning. 2015.
Chen, Zengshi, Luther W. White, and Huimin Zhang. "Predicting behavior of sucker-rod pumping systems with optimal control." Journal of Dynamic Systems, Measurement, and Control 140.5 (2018).

* cited by examiner

PUMP SYSTEMS AND METHODS TO IMPROVE PUMP LOAD PREDICTIONS

BACKGROUND

The present disclosure relates generally to pump systems and methods to improve pump load predictions of wellbore pumps.

Downhole pump assemblies are sometimes deployed at well sites during hydrocarbon production operations to pump hydrocarbon resources from a downhole region, upward, to the surface. Simulations and models of such pump assemblies are sometimes developed and used to predict the amount of hydrocarbon resources that are pumped to the surface. However, such simulations and models are sometimes inaccurate and are not generated in real-time or near real-time.

BRIEF DESCRIPTION OF THE DRAWINGS

Illustrative embodiments of the present disclosure are described in detail below with reference to the attached drawing figures, which are incorporated by reference herein, and wherein.

Figure 1:
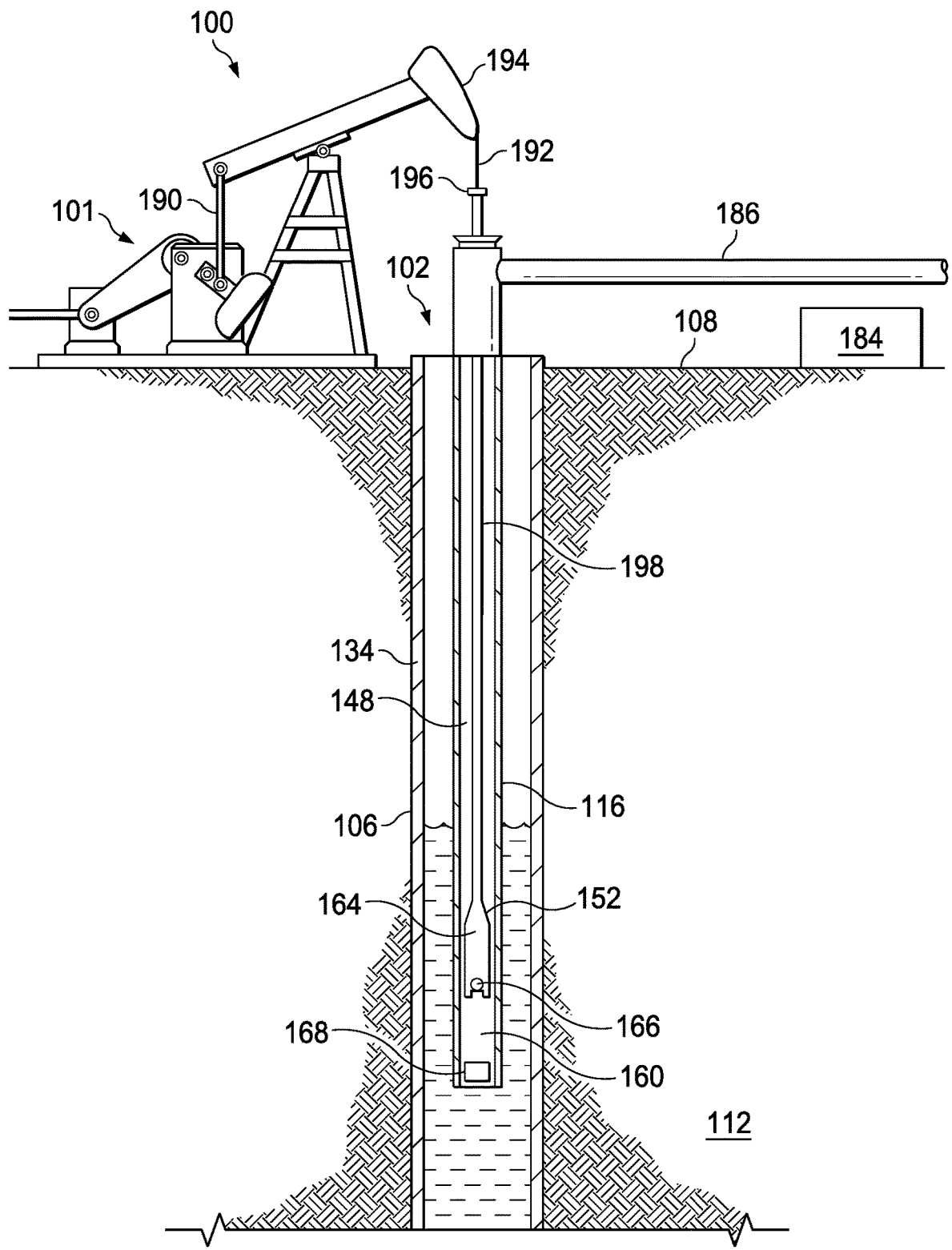
FIG. 1 is a schematic, side view of a production environment in which a sucker rod pump is deployed near a wellbore to pump hydrocarbon resources from a region downhole to the surface.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to pump systems and methods to improve pump load predictions of wellbore pumps. As referred to herein, a wellbore pump includes any pump that pumps hydrocarbon resources from a subterranean or subsurface location to the surface. Examples of wellbore pumps include sucker rod pumps, beam pumps, artificial lifts, as well as other types of pumps that pump hydrocarbon resources to the surface. The wellbore pump includes a rod (e.g., a sucker rod) that alternatively moves downward into a wellbore and upward towards the surface to pump hydrocarbon resources from a downhole region toward the surface, where a downward motion of the sucker rod is hereafter referred to as a "down stroke" and an upward motion of the sucker rod pump is hereafter referred to as an "up stroke." Further, the combination of an up stroke and a subsequent down stroke immediately after the up stroke, or alternatively, the combination of a down stroke and a subsequent up stroke immediately after the down stroke is referred to as a pumping cycle. Further, the amount of hydrocarbon resources or other fluids (e.g., formation fluids, treatment fluids, etc.) or particles a wellbore pump displaces during a pumping cycle is hereafter referred to as a "pump load." During production operations, the wellbore pump engages in multiple pumping cycles to draw hydrocarbon resources to the surface.

Mathematic Models incorporating physics, such as physics based models that predict the pump load of a wellbore pump, are sometimes utilized to predict the pump load. Such mathematical models utilize properties of the wellbore pump (e.g., the length of a sucker rod of the wellbore pump, the displacement of the sucker rod, etc.) as input parameters of the respective models to generate accurate predictions of the pump load. An example of a physics based model that utilizes multiple properties of the wellbore pump are provided in the paragraphs below. After the start of a pump cycle, a prediction of a pump load of the wellbore pump is made based on the physics based model. Further, the actual pump load is measured and a Bayesian Optimization is performed to match the predicted pump load with the measured pump load. As referred to herein, the predicted pump load matches the measured pump load if the difference between the predicted pump load and the measured pump load is less than a threshold value (e.g., within a 10% variance, a 5% variance, within an 1% variance, 0% variance, or another threshold variance). More particularly, a Bayesian Optimization of the pump load is a stochastic optimization using Gaussian process regression analysis of the pump load that optimizes multiple parameters that define the wellbore pump (e.g., stroke length of the rod, cross-sectional area of the rod, material properties of the rod, etc.) to improve the prediction of the pump load to match the predicted pump load with the measured pump load.

Figure 2:
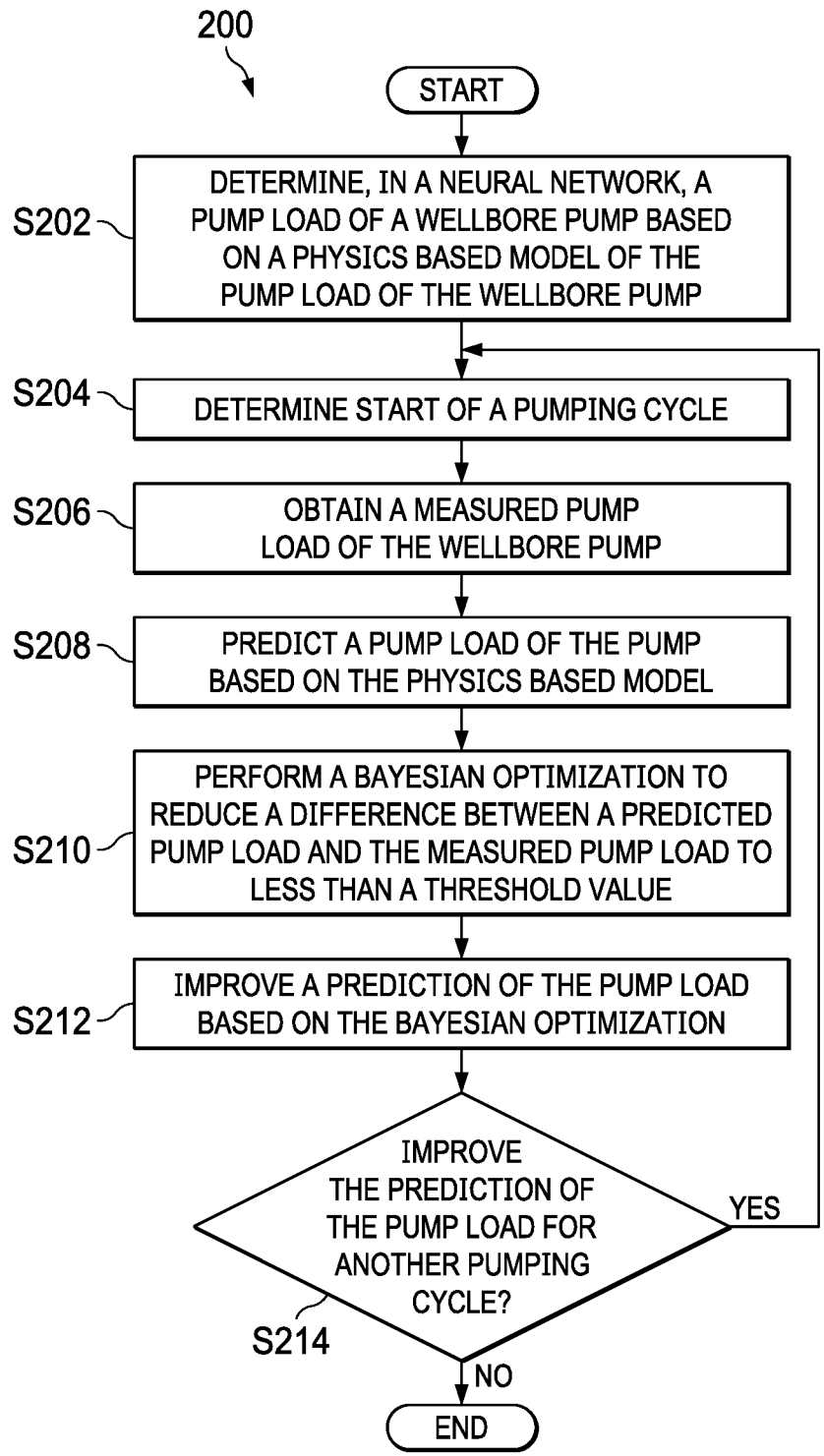
FIG. 2 is a flowchart of a process to improve a pump load of the sucker rod pump of FIG. 1.
Figure 3:
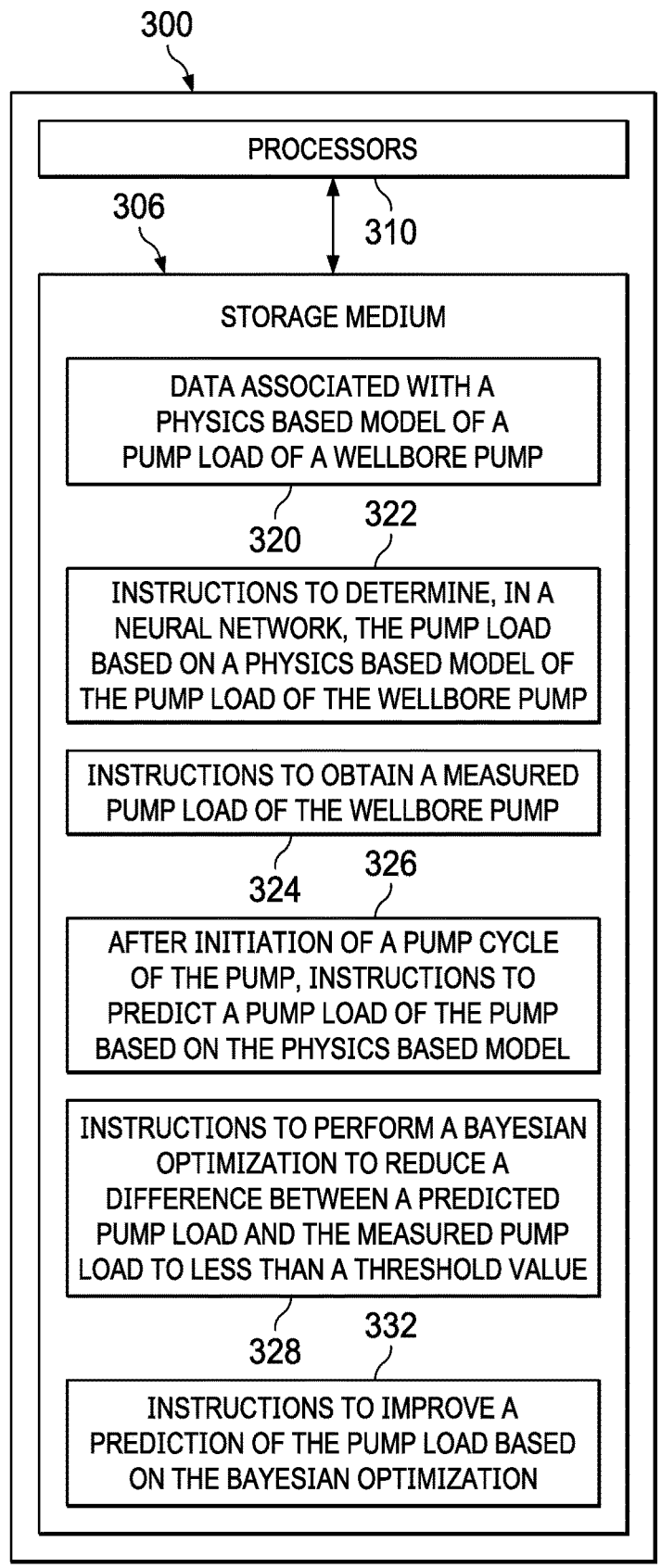
FIG. 3 is a block diagram of a pump system that is operable of performing operations illustrated in the process of FIG. 2 to improve the pump load of a wellbore pump.

In some embodiments, the previously described operations to generate a model of the pump load, predict the pump load, and to perform the Bayesian Optimization to match the predicted pump load with the measured pump load are performed in a single framework of a neural network to reduce to computation time of the foregoing operations and in real-time or near real-time. More particularly, a neural network uses weights and bias to build a non-linear mapping between the inputs and the outputs using layers with neurons. In some embodiments, one or more parameters that define the wellbore pump (e.g., stroke length of the rod, pump cycle time, location of the downward or upward stroke, etc.) are modified to match the predicted pump load with the measured pump load. In some embodiments, historical values of the pump load (e.g., pump load of a previous cycle, average pump load of a threshold number of previous cycles, etc.) are analyzed, and one or more parameters of the Bayesian Optimization are adjusted based on the historical values of the pump load to match the predicted pump load with the measured pump load. In some embodiments, a simulated annealing technique is utilized to match the predicted pump load with the measured pump load. In some embodiments, a genetic algorithm is utilized to match the predicted pump load with the measured pump load. In some embodiments, dynagraphs of the predicted and measured pump loads are also generated. In one or more of such embodiments, comparisons of dynagraphs of the predicted pump load and the measured pump load are generated and provided for display on an electronic device of an analyst for assessment of the predicted and measured pump load. Additional descriptions of the foregoing systems and methods to improve pump load predictions of wellbore pumps are described in the paragraphs below and are illustrated in FIGS. 1-3.

Now turning to the figures, FIG. 1 is a schematic, side view of a production environment 100 in which a sucker rod pump 101 is deployed near a wellbore 106 to pump hydrocarbon resources from a region downhole to surface 108. In the embodiment of FIG. 1, a well 102 having wellbore 106 extends from surface 108 of the well 102 to or through a subterranean formation 112. A casing 134 is deployed along wellbore 106 to insulate downhole tools and strings deployed in casing 134, to provide a path for hydrocarbon resources flowing from subterranean formation 112, to prevent cave-ins, and/or to prevent contamination of subterranean formation 112. Casing 134 is normally surrounded by a cement sheath, which is deposited in an annulus between the casing 134 and wellbore 106 to fixedly secure casing 134 to the wellbore 106 and to form a barrier that isolates casing 134. Although not depicted, there may be layers of casing concentrically placed in wellbore 106, each having a layer of cement or the like deposited thereabout.

In the illustrated embodiment, sucker rod pump 101 includes a pumping jack 190 having a horse head 194. A bridle 192 extends from horsehead 194 of pumping jack 190 and is coupled to a polished rod 196. At a position further downhole, polished rod 196 is coupled to sucker rod 198. In some embodiments, sucker rod 198 includes steel rods that are screwed together to form a continuous "string" that connects a pump 152 inside of a tubing string 116 to pumping jack 190. As referred to herein, tubing string 116 refers to any conveyance having an annulus that provides fluid flow from a downhole region to surface 108 or from surface 108 to a downhole region.

In the illustrated embodiment, pump 152 includes a barrel 160 and a moveable piston 164. When pumping jack 190 is actuated, moveable piston 164 alternatively moves upward toward surface 108 and downward away from surface 108 through barrel 160, thereby creating a pressure within barrel 160. Further, a traveling valve 166 and a standing valve 168 are coupled to piston 164 and barrel 160 respectively. In the illustrated embodiment, traveling valve 166 is configured to allow fluid flow upward through an annulus 148 of tubing string 116 toward surface 108 during an up stroke of sucker rod 198, whereas standing valve 168 is configured to restrict fluid flow downward out of barrel 160 during a down stroke. The continuous up stroke and down stroke of sucker rod 198 allows fluids, such as hydrocarbon resources, to flow upward through annulus 148 toward surface 108. An outflow tube 186 is connected to tubing string 116 to provide a conduit for fluids flowing toward surface 108 to flow out of tubing string 116, and into, for example, a container (not shown) or a compartment configured to hold and store the fluid.

In the illustrated embodiment, a controller 184 operable to predict a pump load of sucker rod pump 101 is located near sucker rod pump 101. As referred to herein, controller 184 may include any electronic and/or optoelectronic device operable to predict a pump load of sucker rod pump 101 and to perform a Bayesian Optimization to match the predicted pump load to the actual pump load. In some embodiments, controller 184 is also housed in a temporary and/or permanent facility (not shown). In some embodiments, controller 184 is deployed at a remote location relative to sucker rod pump 101. Additional operations of controller 184 are provided in the paragraphs below. In some embodiments, controller 184 includes a storage medium containing instructions for predicting the pump load of sucker rod pump 101. In one or more of such embodiments, the storage medium also contains historical data of previous predictions and measurements. In one or more of such embodiments, controller 184 also transmits data via telemetry downhole to a downhole device or component, such as a downhole component of sucker rod pump 101. In some embodiments, sucker rod pump 101 and controller 184 together form a pump system. In one or more of such embodiments, controller 184 controls displacement of sucker rod 198, actuation of piston 164 as well as other parameters to match the predicted pump load with the measured pump load. Additional descriptions of operations performed to predict a pump load of a sucker rod pump are provided in the paragraphs below.

Although FIG. 1 illustrates a sucker rod pump, in other embodiments, where a beam-pump, an artificial lift, or another type of pump system having a rod that engages in alternative up strokes and down strokes to pump fluids to the surface is deployed during production, controller 184 is operable of performing operations described herein to match the predicted pump load to the actual pump load. Further, although sucker rod pump 101 of FIG. 1 includes a polished rod 196 and a sucker rod 198, in some embodiments, polished rod 196 and sucker rod 198 are replaced by a single rod. Further, although sucker rod pump 101 of FIG. 1 utilizes a traveling valve 166 and a standing valve 168 to facilitate and restrict fluid movement during up strokes and down strokes, respectively, in other embodiments, sucker rod pump 101 utilizes a different mechanism to pump fluid toward the surface. Further, although FIG. 1 illustrates controller 184 as above surface 108, in some embodiments, one or more components of controller 184 that are operable of performing operations described herein to match the predicted pump load to the actual pump load are deployed in downhole locations or at remote locations.

FIG. 2 is a flowchart of a process 200 to improve a pump load of sucker rod pump 101 of FIG. 1. Although operations in the process 200 are shown in a particular sequence, certain operations may be performed in different sequences or at the same time where feasible.

As described below, process 200 provides an intuitive way for predicting and improving predicted pump loads of pumps, such as sucker rod pump 101 of FIG. 1. In some embodiments, the process described below is performed in a single framework of a neural network, thereby reducing the amount of time used to predict the pump load and to match the predicted pump load to the measured pump load. In some embodiments, operations to predict the pump load and to match the predicted pump load with the measured pump load are performed in real-time or near real-time, thereby not only reducing the amount of time spent performing the operations, but also allowing an analyst to analyze the predicted pump load and to match the predicted pump load to the measured pump load in real-time or near real-time. The foregoing also allows the analyst to make informed real-time or near real-time adjustments to correct human and machine errors, thereby reducing the financial costs as well as safety hazards attributed to errors of the predicted pump load.

At block S202, a pump load of a wellbore pump is determined based on a physics based model of the pump load of the wellbore pump in a neural network. In some embodiments, a physic based model of the pump load is expressed by the following equation:

$$my_{tt} + \frac{\pi \gamma v}{2L} * y_t - (ay_x) = \text{EQ 1}$$
$$-\left(1 - \frac{x}{L}\right) * \left[mw_{tt} + \frac{\pi \gamma v}{2L} * w_t\right] - \frac{x}{L} * \left[mu_{tt} + \frac{\pi \gamma v}{2L} * u_t\right] + \frac{a_x}{L} * u,$$

where m is a cross section of a rod of the wellbore pump multiplied by a density of the rod, y is a transformed displacement, t is time, L is a length of the rod, x is a location of a stroke of the rod, w is a rod displacement, u is a pump displacement, $\gamma$ is a damping factor, v is a velocity of sound, and a is =144*g*A*E, where g is a gravitational constant, A is the cross section of the rod, and E is equal to Young's Modulus. In one or more of such embodiments, the boundary conditions of the foregoing model are y=0 at x=0, y=0 at x=L, and y=0 at t=0∀x. In one or more of such embodiments, the inputs of EQ. 1 are x, t, w, and u and the physics based model is solved in the neural network for y as a function of w and t. Further, a cost function of the physics based model is expressed by the following equation:

$$\text{Cost}_{NN} = my_{tt} + \frac{\pi \gamma v}{2L} * y_t - (ay_x) = \text{EQ 2}$$
$$-\left(1 - \frac{x}{L}\right) * \left[mw_{tt} + \frac{\pi \gamma v}{2L} * w_t\right] - \frac{x}{L} * \left[mu_{tt} + \frac{\pi \gamma v}{2L} * u_t\right] + \frac{a_x}{L} * u,$$

where m is a cross section of a rod of the wellbore pump multiplied by a density of the rod, y is a transformed displacement, t is time, L is a length of the rod, x is a location of a stroke of the rod, w is a rod displacement, u is a pump displacement, $\gamma$ is a damping factor, v is a velocity of sound, and a is =144*g*A*E, where g is a gravitational constant, A is the cross section of the rod, and E is equal to Young's Modulus.

At block S204, the start of a pumping cycle is determined and at block S206, a measured pump load of the wellbore pump is determined. At block S208, the pump load of the wellbore pump is predicted based on the physics based model. In some embodiments, the predicted pump load is expressed by the following equation:

EQ 3: $\lambda_{predicted}$=−E*A*(y (L, t)+(u (t)−w (t)))*x, where E is equal to Young's Modulus, A is a cross section of a rod of the wellbore pump, y is a transformed displacement, t is time, L is a length of the rod, w is a rod displacement, x is a location of a stroke of the rod, and u is a pump displacement.

At block S210, a Bayesian Optimization is performed to reduce a difference between the predicted pump load and the measured pump load to less than a threshold value. At block S212, the prediction of the pump load is improved based on the Bayesian Optimization. In some embodiments, a cost function of the Bayesian Optimization is used to reduce the difference between the predicted pump load and the measured pump load to improve the prediction of the pump load is expressed by the following equation:

$$\text{Cost} = \int_0^t (\lambda_{predicted} - \lambda_{determined}))^2 dt, \quad \text{EQ 4}$$

where $\lambda_{predicted}$ is the predicted pump load as expressed by EQ. 2, $\lambda_{determined}$ is the measured pump load, and t is time.

In some embodiments, one or more parameters of the Bayesian Optimization are adjusted to match the predicted pump load to the measured pump load. In some embodiments, a displacement of the rod of the wellbore pump, such as sucker rod 198 of FIG. 1, is adjusted to match the predicted pump load to the measured pump load. In one or more embodiments, the cycle time of a pump cycle is adjusted (e.g., lengthened or shortened) to match the predicted pump load to the measured pump load. In some embodiments, historical values of the pump load are obtained and are used as values for one or more parameters of the Bayesian Optimization. For example, where one historical value is an average cycle time of the 10 previous pumping cycles, the average cycle time is used as the cycle time. In some embodiments, the processes performed in blocks S202, S208, S210, and S212 are performed in a single frame work of the neural network to reduce computation time. In some embodiments, a dynagraph of the pump cycle of the wellbore pump is also generated.

At block S214, a determination of whether a prediction for another pump load should be improved is made. If a determination to improve a prediction of a pump load of another cycle is made, then the process returns to block S204. For example, if a determination is made to improve the prediction of the pump load of the next cycle (a second pump load), a second measured pump load is obtained. Further, after initiation of a second pump cycle of the wellbore pump, a prediction of the second pump load of the wellbore pump is made based on the physics based model, a second Bayesian Optimization is performed to reduce a difference between a second predicted pump load and the second measured pump load to less than the threshold value, and the prediction of the second pump load is improved based on the Bayesian Optimization.

In some embodiments, the foregoing operations to improve the prediction of the second pump load are also performed in a single framework of the neural network. In some embodiments, the operations performed in blocks S204, S206, S208, S210, S212, and S214 are repeated for a threshold number of cycles. Alternatively, if a determination not to improve a prediction of a pump load of another cycle is made, then the process ends. Further, the operations in process 200 may also be performed to improve other types of wellbore pumps, such as, but not limited to, beam pumps, artificial lifts, as well as other types of pump and pump systems that utilize a rod or beam to displace hydrocarbon resources from a downhole location to the surface.

FIG. 3 is a block diagram of a pump system 300 that is operable of performing operations illustrated in the process of FIG. 2 to improve the pump load of a wellbore pump, such as sucker rod pump 101 of FIG. 1. Pump system 300 includes a storage medium 306 and one or more processors 310. Storage medium 306 may be formed from data storage components such as, but not limited to, read-only memory (ROM), random access memory (RAM), flash memory, magnetic hard drives, solid state hard drives, CD-ROM drives, DVD drives, floppy disk drives, as well as other types of data storage components and devices. In some embodiments, storage medium 306 includes multiple data storage devices. In further embodiments, the multiple data storage devices may be physically stored at different locations. In the embodiment of FIG. 1, storage medium 306 and processors 310 are components of controller 184. In some embodiments, storage medium 306 and processors 310 are stored remotely relative to each other.

Data associated with physics based models or other mathematical models for predicting a pump load of a wellbore pump are stored at a first location 320 of storage medium 306. In one or more embodiments, historical data of simulations of the pump load are also stored at first location 320 of the storage medium 306. As shown in FIG. 3, instructions to determine, in a neural network, the pump load based on a physics based model of the pump load of the wellbore pump are stored in a second location 322. Further, instructions to obtain a measured pump load of the wellbore pump are stored in a third location 324. Further, instructions to predict a pump load of the wellbore pump based on the physics based model after initiation of a pump cycle are stored at a fourth location 326. Further, instructions to perform a Bayesian Optimization to reduce a difference between a predicted pump load and the measured pump load to less than a threshold value are stored at a fifth location 328. Further, instructions to improve a prediction of the pump load based on the Bayesian Optimization are stored at sixth location 332. Additional instructions that are performed by processor 310 are stored in other locations of the storage medium 306.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flow charts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a method to improve prediction of a pump load of a wellbore pump, the method comprising determining, in a neural network, a pump load of a wellbore pump based on a physics based model of the pump load of the wellbore pump; obtaining a measured pump load of the wellbore pump; and after initiation of a pump cycle of the wellbore pump: predicting the pump load of the wellbore pump based on the physics based model; performing a Bayesian Optimization to reduce a difference between a predicted pump load and the measured pump load to less than a threshold value; and improving a prediction of the pump load based on the Bayesian Optimization.

Clause 2, the method of clause 1, wherein the physics based model of the pump load of the wellbore pump is $$my_{tt} = cy_t - (ay_x) = -\left(1 - \frac{x}{L}\right) * \left[mw_{tt} + \frac{\pi \gamma v}{2L} * w_t\right] - \frac{x}{L}\left[mu_{tt} + \frac{\pi \gamma v}{2L} * u_t\right] + \frac{a_x}{L} * u,$$

wherein m is a cross section of a rod of the wellbore pump multiplied by a density of the rod, y is a transformed displacement, t is time, L is a length of the rod, x is a location of a stroke of the rod, w is a rod displacement, u is a pump displacement, $\gamma$ is a damping factor, v is a velocity of sound, and a is =144*g*A*E, wherein g is a gravitational constant, A is the cross section of the rod, and E is equal to Young's Modulus.

Clause 3, the method of clause 2, wherein initial boundary conditions of the physics based model are y=0 at x=0, y=0 at x=L, and y=0 at t=0 $\forall$x.

Clause 4, the method of clause 3, further comprising determining a cost function of the physics based model, wherein the cost function is $$my_{tt} + cy_t - (ay_x) = -\left(1 - \frac{x}{L}\right) * \left[mw_{tt} + \frac{\pi \gamma v}{2L} * w_t\right] - \frac{x}{L} * \left[mu_{tt} + \frac{\pi \gamma v}{2L} * u_t\right] + \frac{a_x}{L} * u.$$

Clause 5, the method of any one of clauses 1-4, wherein the predicted pump load is $\lambda_{predicted}$=–E*A*(y (L, t)+(u (t)–w (t)))*x, wherein E is equal to Young's Modulus, A is a cross section of a rod of the wellbore pump, y is a transformed displacement, t is time, L is a length of the rod, x is a location of a stroke of the rod, and u is a pump displacement.

Clause 6, the method of clause 5, wherein performing the Bayesian Optimization comprises adjusting one or more parameters for predicting the predicted pump load to reduce the difference between the predicted pump load and the measured pump load to less than the threshold value.

Clause 7, the method of clause 6, wherein one of the one or more parameters is a displacement of a polished rod of the wellbore pump, the method further comprising adjusting a value of the displacement of the polished rod to reduce the difference between the predicted pump load and the measured pump load to less than the threshold value.

Clause 8, the method of clauses 6 or 7, wherein one of the one or more parameters is cycle time of the pump cycle, the method further comprising adjusting a value of the cycle time to reduce the difference between the predicted pump load and the measured pump load to less than the threshold value.

Clause 9, the method of any of clauses 6-8, further comprising determining a historical value of the pump load, wherein performing the Bayesian Optimization comprises performing the Bayesian Optimization based on the historical value of the pump load.

Clause 10, the method of any of clauses 1-9, wherein operations performed to solve the physics based model, predict the pump load, perform the Bayesian Optimization, and improve the prediction of the pump load are performed in a single framework of the neural network.

Clause 11, the method of any of clauses 1-10, further comprising generating a dynagraph of the pump cycle of the wellbore pump.

Clause 12, the method of any of clauses 1-11, further comprising: obtaining a second measured pump load of the wellbore pump; and after initiation of a second pump cycle of the wellbore pump: predicting a second pump load of the wellbore pump based on the physics based model; performing a second Bayesian Optimization to reduce a difference between a second predicted pump load and the second measured pump load to less than the threshold value; and improving a prediction of the second pump load based on the Bayesian Optimization.

Clause 13, a pump system, comprising: a wellbore pump having a rod; and one or more processors operable to: determine, in a neural network, a pump load of the wellbore pump based on a physics based model of the pump load of the wellbore pump; obtain a measured pump load of the wellbore pump; and after a pump cycle of the wellbore pump has initiated: predict a pump load of the wellbore pump based on the physics based model; perform a Bayesian Optimization to reduce a difference between a predicted pump load and the measured pump load to less than a threshold value; and improve a prediction of the pump load based on the Bayesian Optimization, wherein operations performed to solve the physics based model, predict the pump load, perform the Bayesian Optimization, and improve the prediction of the pump load are performed in a single framework of the neural network.

Clause 14, the pump system of clause 13, wherein the physics based model of the pump load of the wellbore pump is $$my_{tt} + cy_t - (ay_x) = -\left(1-\frac{x}{L}\right)*\left[mw_{tt} + \frac{\pi\gamma v}{2L}*w_t\right] - \frac{x}{L}*\left[mu_{tt} + \frac{\pi\gamma v}{2L}*u_t\right] + \frac{a_x}{L}*u,$$

wherein m is a cross section of a rod of the wellbore pump multiplied by a density of the rod, y is a transformed displacement, t is time, L is a length of the rod, x is a location of a stroke of the rod, w is a rod displacement, u is a pump displacement, $\gamma$ is a damping factor, v is a velocity of sound, and a is $-144*g*A*E$, wherein g is a gravitational constant, A is the cross section of the rod, and E is equal to Young's Modulus.

Clause 15, the system of clauses 13 or 14, wherein the predicted pump load is $\lambda_{predicted} = -E*A*(y (L,t)+(u (t)-w(t)))*x$, wherein E is equal to Young's Modulus, A is a cross section of a rod of the wellbore pump, y is a transformed displacement, t is time, L is a length of the rod, x is a location of a stroke of the rod, and u is a pump displacement.

Clause 16, the system of clause 15, wherein the processors are operable to adjust one or more parameters for predicting the predicted pump load to reduce the difference between the predicted pump load and the measured pump load to less than the threshold value.

Clause 17, the system of clause 16, wherein one of the one or more parameters is a displacement of a polished rod of the wellbore pump, and wherein the one or more processors are further operable to adjust a value of the displacement of the polished rod to reduce the difference between the predicted pump load and the measured pump load to less than the threshold value.

Clause 18, the system of clauses 16 or 17, wherein one of the one or more parameters is cycle time of the pump cycle, and wherein the one or more processors are further operable to adjust a value of the cycle time to reduce the difference between the predicted pump load and the measured pump load to less than the threshold value.

Clause 19, a machine-readable medium comprising instructions stored therein, which when executed by one or more processors, causes the one or more processors to perform operations comprising: determining, in a neural network, a pump load of a wellbore pump based on a physics based model of the pump load of the wellbore pump; obtaining a measured pump load of the wellbore pump; and after initiation of a pump cycle of the wellbore pump: predicting the pump load of the wellbore pump based on the physics based model; performing a Bayesian Optimization to reduce a difference between a predicted pump load and the measured pump load to less than a threshold value; and improving a prediction of the pump load based on the Bayesian Optimization, wherein operations performed to solve the physics based model, predict the pump load, perform the Bayesian Optimization, and improve the prediction of the pump load are performed in a single framework of the neural network.

Clause 20, the machine-readable medium of clause 19, wherein the instructions, which when executed by one or more processors, causes the one or more processors to perform operations comprising: obtaining a second measured pump load of the wellbore pump; and after initiation of a second pump cycle of the wellbore pump; predicting a second pump load of the wellbore pump based on the physics based model; performing a second Bayesian Optimization to reduce a difference between a second predicted pump load and the second measured pump load to less than the threshold value; and improving a prediction of the second pump load based on the Bayesian Optimization.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A method to improve prediction of a pump load of a wellbore pump, the method comprising:
   determining, in a neural network, a pump load of a wellbore pump based on a physics based model of the pump load of the wellbore pump; wherein the wellbore pump comprises a sucker rod and a cycle time of a pump cycle;
   obtaining a measured pump load of the wellbore pump; and
   after initiation of the pump cycle of the wellbore pump:
      predicting the pump load of the wellbore pump based on the physics based model, wherein the predicted pump load is $\lambda_{predicted} = -E*A*(y (L, t)+(u (t)-w(t)))*x$, wherein E is equal to Young's Modulus, A is a cross section of a rod of the wellbore pump, y is a transformed displacement, t is time, L is a length of the rod, x is a location of a stroke of the rod, w is a rod displacement, and u is a pump displacement;
      performing a Bayesian Optimization to match a predicted pump load to the measured pump load by adjusting the cycle time of the pump cycle of the wellbore pump based on a historical value of a cycle time;
      determining a cost function of the physics based model; and
      improving a prediction of the pump load based on the Bayesian Optimization, wherein improving the prediction comprises applying the cost function of $Cost = \int_0^t (\lambda_{predicted} - \lambda_{determined})^2 \, dt$ to reduce a difference between the predicted pump load and the measured pump load, wherein $\lambda_{determined}$ is the measured pump load.

2. The method of claim 1, wherein the physics based model of the pump load of the wellbore pump is $$my_{tt} + \frac{\pi\gamma v}{2L}*y_t(ay_x) = -\left(1-\frac{x}{L}\right)*\left[mw_{tt} + \frac{\pi\gamma v}{2L}*w_t\right] - \frac{x}{L}*\left[mu_{tt} + \frac{\pi\gamma v}{2L}*u_t\right] + \frac{a_x}{L}*u,$$

wherein m is a cross section of a rod of the wellbore pump multiplied by a density of the rod, y is a transformed displacement, $\gamma$ is a damping factor, v is a velocity of sound, and a is $=144*g*A*E$, wherein g is a gravitational constant.

3. The method of claim 2, wherein initial boundary conditions of the physics based model are y=0 at x=0, y=0 at x=L, and y=0 at t=0∀x.

4. The method of claim 3, further comprising determining a second cost function of the physics based model, wherein the cost function is $$my_{tt} + \frac{\pi \gamma v}{2L} * y_t(ay_x) = -\left(1 - \frac{x}{L}\right) * \left[mw_{tt} + \frac{\pi \gamma v}{2L} * w_t\right] - \frac{x}{L} * \left[mu_{tt} + \frac{\pi \gamma v}{2L} * u_t\right] + \frac{a_x}{L} * u.$$

5. The method of claim 1, wherein performing the Bayesian Optimization comprises adjusting one or more parameters for predicting the predicted pump load to reduce the difference between the predicted pump load and the measured pump load to less than a threshold value based on the determined cost function of the physics based model.

6. The method of claim 5, wherein one of the one or more parameters is a displacement of a polished rod of the wellbore pump.

7. The method of claim 5, wherein one of the one or more parameters is cycle time of the pump cycle.

8. The method of claim 1, further comprising determining a historical value of the pump load, wherein performing the Bayesian Optimization comprises performing the Bayesian Optimization based on the historical value of the pump load.

9. The method of claim 1, wherein operations performed to solve the physics based model, predict the pump load, perform the Bayesian Optimization, and improve the prediction of the pump load are performed in a single framework of the neural network.

10. The method of claim 1, further comprising generating a dynagraph of the pump cycle of the wellbore pump.

11. The method of claim 1, further comprising:
obtaining a second measured pump load of the wellbore pump; and
after initiation of a second pump cycle of the wellbore pump:
predicting a second pump load of the wellbore pump based on the physics based model;
performing a second Bayesian Optimization to reduce a difference between a second predicted pump load and the second measured pump load to less than a threshold value; and
improving a prediction of the second pump load based on the Bayesian Optimization.

12. A pump system, comprising:
a wellbore pump having a sucker rod and a cycle time of a pump cycle;
a storage medium; and
one or more processors operable to:
determine, in a neural network, a pump load of the wellbore pump based on a physics based model of the pump load of the wellbore pump;
obtain a measured pump load of the wellbore pump; and
after the pump cycle of the wellbore pump has initiated:
predict the pump load of the wellbore pump based on the physics based model;
perform a Bayesian Optimization to match a predicted pump load to the measured pump load by adjusting the cycle time of the pump cycle of the wellbore pump based on a historical value of a cycle time, wherein the predicted pump load is $\lambda_{predicted} = -E*A*(y\,(L,t)+(u(t)-w\,(t)))*x$, wherein E is equal to Young's Modulus, A is a cross section of a rod of the wellbore pump, y is a transformed displacement, t is time, L is a length of the rod, x is a location of a stroke of the rod, w is a rod displacement, and u is a pump displacement;
determine a cost function of the physics based model; and
improve a prediction of the pump load based on the Bayesian Optimization,
wherein improving the prediction comprises applying the cost function of $Cost = \int_0^t (\lambda_{predicted} - \lambda_{determined})^2\,dt$ to reduce a difference between the predicted pump load and the measured pump load, wherein $\lambda_{determined}$ is the measured pump load, and
wherein operations performed to solve the physics based model, predict the pump load, perform the Bayesian Optimization, and improve the prediction of the pump load are performed in a single framework of the neural network.

13. The pump system of claim 12, wherein the physics based model of the pump load of the pump is $$my_{tt} + \frac{\pi \gamma v}{2L} * y_t - (ay_x) = -\left(1 - \frac{x}{L}\right) * \left[mw_{tt} + \frac{\pi \gamma v}{2L} * w_t\right] - \frac{x}{L} * \left[mu_{tt} + \frac{\pi \gamma v}{2L} * u_t\right] + \frac{a_x}{L} * u,$$

wherein m is a cross section of a rod of the wellbore pump multiplied by a density of the rod, y is a transformed displacement, γ is a damping factor, v is a velocity of sound, and a is =144*g*A*E, wherein g is a gravitational constant.

14. The system of claim 12, wherein the processors are operable to adjust one or more parameters for predicting the predicted pump load to reduce the difference between the predicted pump load and the measured pump load to less than a threshold value.

15. The system of claim 14, wherein one of the one or more parameters is a displacement of a polished rod of the wellbore pump.

16. The system of claim 14, wherein one of the one or more parameters is cycle time of the pump cycle.

17. A machine-readable medium comprising instructions stored therein, which when executed by one or more processors, causes the one or more processors to perform operations comprising:
determining, in a neural network, a pump load of a wellbore pump based on a physics based model of the pump load of the wellbore pump; wherein the wellbore pump comprises a sucker rod and a cycle time of a pump cycle;
obtaining a measured pump load of the wellbore pump; and
after initiation of the pump cycle of the wellbore pump:
predicting the pump load of the wellbore pump based on the physics based model, wherein the predicted pump load is $\lambda_{predicted} = -E*A*(y\,(L,t)+(u\,(t)-w\,(t)))*x$, wherein E is equal to Young's Modulus, A is a cross section of a rod of the wellbore pump, y is a transformed displacement, t is time, L is a length of the rod, x is a location of a stroke of the rod, w is a rod displacement, and u is a pump displacement;
performing a Bayesian Optimization to match a predicted pump load to the measured pump load by adjusting the cycle time of the pump cycle of the wellbore pump based on a historical value of the cycle time;

determining a cost function of the physics based model; and improving a prediction of the pump load based on the Bayesian Optimization, wherein improving the prediction comprises applying the cost function of $$Cost = \int_0^t (\lambda_{predicted} - \lambda_{determined}))^2$$

dt to reduce a difference between the predicted pump load and the measured pump load, wherein λdetermined is the measured pump load, and wherein operations performed to solve the physics based model, predict the pump load, perform the Bayesian Optimization, and improve the prediction of the pump load are performed in a single framework of the neural network.

18. The machine-readable medium of claim 17, wherein the instructions, which when executed by one or more processors, causes the one or more processors to perform operations comprising:

obtaining a second measured pump load of the wellbore pump; and after initiation of a second pump cycle of the wellbore pump:

predicting a second pump load of the wellbore pump based on the physics based model;

performing a second Bayesian Optimization to reduce a difference between a second predicted pump load and the second measured pump load to less than a threshold value; and improving a prediction of the second pump load based on the Bayesian Optimization.

* * * * *